United States Patent
Chen et al.

(10) Patent No.: US 10,064,091 B2
(45) Date of Patent: Aug. 28, 2018

(54) BUFFER STATUS REPORTING METHOD, DEVICE, TERMINAL, AND ENB

(71) Applicant: CHINA MOBILE COMMUNICATIONS CORPORATION, Beijing (CN)

(72) Inventors: Zhuo Chen, Beijing (CN); Xiaodong Xu, Beijing (CN); Xiaowei Jiang, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 0 days.

(21) Appl. No.: 15/126,201

(22) PCT Filed: Mar. 13, 2015

(86) PCT No.: PCT/CN2015/074148
§ 371 (c)(1),
(2) Date: Sep. 14, 2016

(87) PCT Pub. No.: WO2015/135492
PCT Pub. Date: Sep. 17, 2015

(65) Prior Publication Data
US 2017/0086093 A1 Mar. 23, 2017

(30) Foreign Application Priority Data
Mar. 14, 2014 (CN) .......................... 2014 1 0096189

(51) Int. Cl.
*H04W 72/00* (2009.01)
*H04W 28/02* (2009.01)
(Continued)

(52) U.S. Cl.
CPC ....... *H04W 28/0278* (2013.01); *H04W 16/32* (2013.01); *H04W 72/1284* (2013.01);
(Continued)

(58) Field of Classification Search
None
See application file for complete search history.

(56) References Cited

U.S. PATENT DOCUMENTS

| 2011/0151886 A1 | 6/2011 | Grayson et al. |
| 2015/0098322 A1 | 4/2015 | Chen |
| 2016/0234714 A1* | 8/2016 | Basu Mallick ..... H04W 28/085 |

FOREIGN PATENT DOCUMENTS

| CN | 102421146 A | 4/2012 |
| CN | 102291200 A | 1/2014 |

(Continued)

OTHER PUBLICATIONS

International Search Report (English version) dated Jun. 15, 2015, issued in International Application No. PCT/CN2015/074148 (4 pages).
(Continued)

Primary Examiner — Suhail Khan
(74) Attorney, Agent, or Firm — Arch & Lake LLP (57) ABSTRACT

A buffer status reporting method, device, terminal, and eNB are provided. The buffer status reporting method is implemented by a wireless communications terminal capable of operating in a dual-connection wireless communications network including a master eNB and a secondary eNB. The processing method includes: determining target upload data; determining, in the target upload data, first data transmitted via either the master eNB or the secondary eNB, and second data transmitted via both of the master eNB and the secondary eNB; sending to the target eNB the total value of the first data buffer size and the second data buffer size, the first data buffer size being the size of the first data, and the second data buffer size being smaller than or equal to the size of the second data.

6 Claims, 3 Drawing Sheets

(51) Int. Cl.
  *H04W 72/12* (2009.01)
  *H04W 16/32* (2009.01)
  *H04W 76/15* (2018.01)
  *H04L 5/00* (2006.01)
  *H04W 88/02* (2009.01)
  *H04W 88/08* (2009.01)

(52) U.S. Cl.
  CPC ........... *H04W 76/15* (2018.02); *H04L 5/0044* (2013.01); *H04W 88/02* (2013.01); *H04W 88/08* (2013.01)

(56) References Cited

FOREIGN PATENT DOCUMENTS

| | | |
|---|---|---|
| CN | 103517351 A | 1/2014 |
| EP | 2858441 A1 | 4/2015 |

OTHER PUBLICATIONS

CN Office Action dated Dec. 21, 2017 for CN Application No. 2014100961899, 19 pages.

EP Office Action dated Oct. 4, 2017 for EP Application No. 15761664.0, 12 pages.

Panasonic: "BSR Reporting Options for Dual Connectivity", 3GPP Draft; R2-140475 BSR Reporting in Dual Connectivity, 3RD Generation Partnership Project (3GPP), Mobile Competence Centre; 650, Route Des Lucioles; F-06921 Sophia-Antipolis Cedex; France vol. RAN WG2, No. Prague, Czech Republic; 2014021-20140214 Feb. 9, 2014, URL: http://www.3gpp.org/ftp/Meetings_3GPP_SYNC/RAN2/Docs/ [retrieved on Feb. 9, 2014], 3 pages.

Catt: "Impact on BSR reporting", 3 GPP Draft; R2-134055; 3RD Generration Partnership Project (3GPP), Mobile Competence Centre; 650, Route Des Lucioles, F-06921 Sophia-Antipolis Cedex; France vol. RAN WG2, No. San Francisco, USA Nov. 13, 2013, URL: http://www.3gpp.org/ftp/Meetings_3GPP_SYNC/RAN/RAN2/Docs/ [retrieved on Nov. 13, 2013], 3 pages.

Huawei et al: BSR for small cell enhancement, 3GPP Draft; R2-133883, 3RD Generation Partnership Project (3GPP), Mobile Competence Centre; 650, Route Des Lucioles; F-06921 Sophia-Antipolis Cedex France vol. RAN WG2, No. San Francisco, USA; 20131111-20131115 Nov. 1, 2013, URL:http://www,3gpp.org/ftp/tsg_ran/WG2_RL2/TSGR2 84/Docs/ [retrieved on Nov. 1, 2018], 4 pages.

* cited by examiner

BUFFER STATUS REPORTING METHOD, DEVICE, TERMINAL, AND ENB

CROSS-REFERENCE TO RELATED APPLICATION

The present application is the U.S. national phase of PCT Application No. PCT/CN2015/074148 filed on Mar. 13, 2015, which claims a priority to Chinese Patent Application No. 201410096189.9 filed on Mar. 14, 2014, the both of which are incorporated by reference herein in their entireties.

TECHNICAL FIELD

The present disclosure relates to the field of communications, and in particular to a method for reporting a buffer status, a device, a terminal and an eNB.

BACKGROUND

In order to effectively improve the coverage and the communication capacity of a system, the 3rd Generation Partnership Project (3GPP) is currently researching deployment of a small cell (or a micro eNB) in the LTE-A system. Compared with a macro eNB (or a macro cell), a radio frequency transmission power of the small cell is smaller than that of the macro eNB, thus, the coverage of the small cell is smaller than that of the macro eNB. One or more micro eNBs are often deployed in a specific region within the coverage of a macro eNB depending on different terrain conditions and customer requirements, such that the coverage of the network is enhanced and radio resources are reused, and the capacity of the system is increased.

Figure 1:
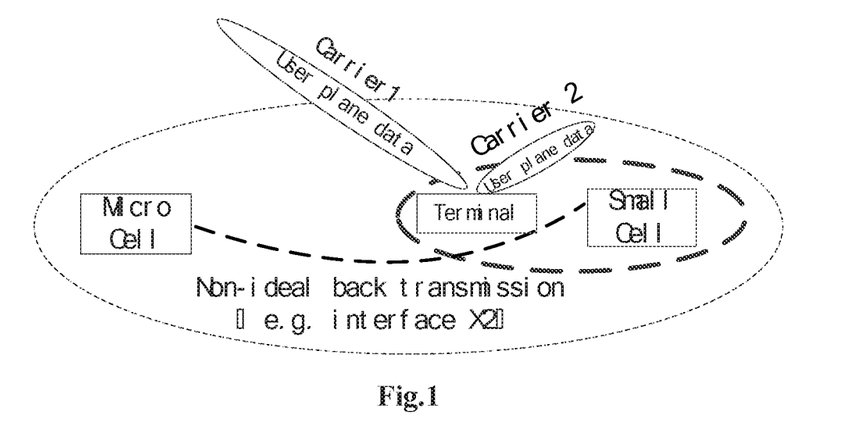
FIG. 1 is a schematic diagram of a typical dual connection network architecture.

A user may keep in a radio resource control (RRC) connection status with a macro cell and a small cell when positioning within the coverage of both the macro cell and the small cell, i.e., the macro cell and the small cell can both serve the user, and the user can maintain two physical communication links with respect to the macro cell and the small cell. In a case that the both eNBs serve the user, an eNB acts as a master eNB (MeNB), and the other eNB acts as a secondary eNB (SeNB). Typically, the MeNB is configured to facilitate the user to control and manage related information, and the SeNB is mainly configured to provide related radio resources to the UE. This network architecture is often referred to as a dual connection mechanism. With this dual connection mechanism, communication rates of an uplink channel and a downlink channel and the communication capacity of the system are enhanced effectively, further, it also has the advantages of signalling optimization and enhanced mobile robustness. A kind of typical dual connection network architecture is shown in FIG. 1, in which, a terminal can receive signals from a macro cell and a small cell at the same time, and information can be transmitted between the macro cell and the small cell.

Figure 2:
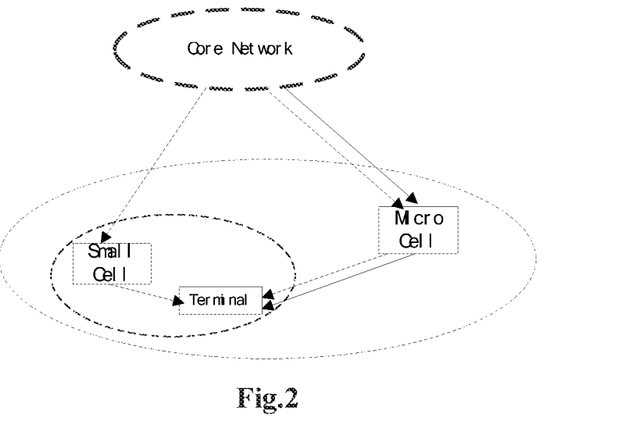
FIG. 2 is a schematic diagram of radio resource transmission between a control plane of a user and a user plane of the user in a case of using a dual connection technology.

In the conventional technologies, reference is made to FIG. 2, in case of using the dual connection mechanism, a control plane of a user is managed by an MeNB, and an SeNB is responsible for providing radio resources of a user plane, in which, a dotted line refers to information transmission of the user plane, a solid line refers to information transmission of the control plane.

In the dual connection mechanism, the related information about the control plane of the user is controlled and managed by the MeNB. Two transmission mechanisms are provided for data of the user plane. The two transmission mechanisms are explained hereinafter taking an example of transmission of downlink data sent from a network to a UE.

A transmission mechanism is that, data from a user is separated at a service gateway (SGW) node in a core network, a portion of the data is transmitted to a UE via an MeNB, and the other portion of the data is transmitted to an SeNB through the SGW and then transmitted to the UE, and this data transmission mechanism is referred to as data distribution for the core network.

The other transmission mechanism is referred to as data distribution for a wireless network, in which, data from a user is first sent to an MeNB through an SGW, and a portion of the data is sent by the MeNB to an SeNB, and then is sent by the SeNB to a UE, and the other portion of the data is directly sent by the MeNB to the UE.

Figure 3:
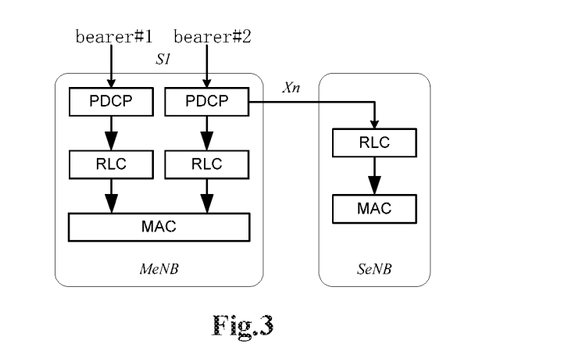
FIG. 3 is a schematic diagram of bearer distribution in a case of downlink data distribution in a related art when a dual connection technology is used.

In a mechanism of the data distribution for the wireless network, bearers are divided between an MeNB and an SeNB, as shown in FIG. 3, in a downlink direction in which data is sent to a UE via a network, data on a bearer#2 is passed through an interface S1 and processed via a Packet Data Convergence Protocol (PDCP) layer of the MeNB, i.e., encryption/integrity protection and header compression are performed on the data, and then a portion of the data is processed via a Radio Link Control/Media Access Control (RLC/MAC) of the MeNB and transmitted to the UE, and the other portion of the data is passed through an interface Xn and processed via RLC/MAC of the SeNB and transmitted to the UE, i.e., this data is distributed to the SeNB and transmitted to the UE. In FIG. 3, data on a bearer#1 is not distributed via the SeNB, but totally processed via the MeNB and sent to the UE.

Figure 4:
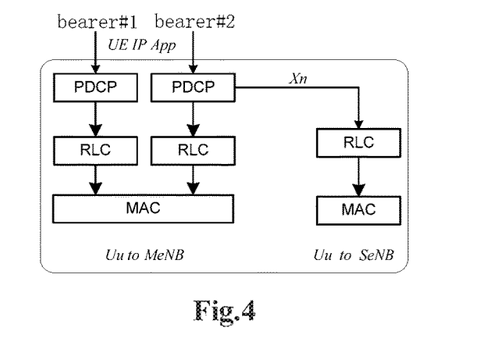
FIG. 4 is a schematic diagram of bearer distribution in a case of uplink data distribution in the related art when a dual connection technology is used.

Further, in an uplink direction of data, i.e., in a direction in which the data is sent to an eNB from a UE, the uplink data is separated between the MeNB and the SeNB when the mechanism of the data distribution is performed on the uplink data, as shown in FIG. 4, in the uplink direction, data on a bearer#2 is passed through an interface UE IP App and processed via the PDCP layer of the MeNB, a portion of the data is processed via an RLC/MAC of the UE and transmitted to the MeNB, and the other portion of the data is processed via another RLC/MAC of the UE and transmitted to the SeNB. In FIG. 4, data on a bearer#1 is not distributed via the SeNB, and is totally processed via a PDCP/RLC/MAC of the UE and sent to the MeNB.

In the conventional technologies, when a UE intends to send data to an eNB, the UE may first report the eNB the size of buffer data, and the eNB may therefore determine and allocate a proper radio resources for the UE based on the size of buffer data. The procedure of reporting the size of buffer data by the UE to the eNB is referred to as Buffer Status Reporting (BSR).

In a case that the UE reports its own BSR, the UE should report a total size of data to be transmitted on each bearer, data transmission of which is uninterrupted, and the UE may report a size of data on bearers, data transmission of which have been interrupted.

Figure 5:
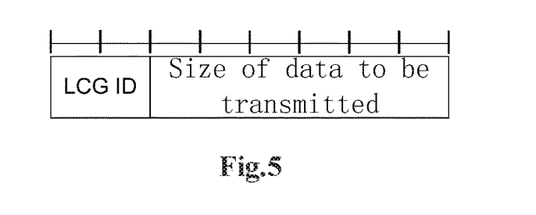
FIG. 5 illustrates a data format of a BSR.

In a case that the UE reports its own BSR, a size of data to be transmitted is calculated as a total size of data to be transmitted on a PDCP layer and an RLC layer included in all of the logic channels of a specific Logical Channel Group (LCG). Specifically, for a size of data to be transmitted on the PDCP layer, the UE should take into account a Protocol Data Unit (PDU) of the PDCP and a Service Data Unit (SDU) and a PDU being not processed by the RLC. Moreover, for a size of data to be transmitted on the RLC layer, the UE should take into account an RLC SDU of the RLC layer or segments of the SDU being not encapsulated into an RLC PDU, and a PDU of the RLC or data blocks to be re-transmitted. When reporting the BSR, the UE indicates a sequence number of the LCG and a corresponding total size of data to be transmitted (Buffer Size), wherein the buffer size may be extended. The general format of the buffer size is shown in FIG. 5, the LCG ID is 2 bits long, and the buffer size is 6 bits long.

When both of the MeNB and the SeNB serve the UE at the same time, the UE should report its data buffer size to both of the MeNB and the SeNB. If uplink data from the UE is transmitted to the MeNB and the SeNB using a distribution mechanism, an error may occur to the BSR from the UE. When uplink bearers of the UE are distributed, i.e., a portion of the uplink data is transmitted to the MeNB, and the rest is transmitted to the SeNB, when the UE reports a BSR for each eNB, the UE may calculate a total size of data to be transmitted on its own LCG and report it to all eNBs, and then the total size of data to be transmitted is received by each eNB. However, in fact, the UE may perform a distribution operation on the uplink data, which causes that a portion of the uplink data is transmitted to a certain eNB, rather than whole of the uplink data. It means that the BSR received by the eNBs from the UE is not accurate. The eNB may allocate excessive radio resources for the UE to transmit data if inaccurate BSR is used by the eNB, thereby radio resources are wasted, and the performance of the system is reduced.

With respect to the above problems, no mechanism is provided to solve the above problems currently. Therefore, technical problems to be solved are that, in a case that both the MeNB and the SeNB provide a dual connection service for the UE, the UE should process a BSR reported by the MeNB and the SeNB when performing distribution transmission on uplink data, such that radio resources are better allocated by the eNBs.

SUMMARY

In view of the above technical problems, the present disclosure provides a method, a device and a terminal for reporting a buffer status, and a method, a device and an eNB for processing a buffer status, with which the eNB can determine a data buffer size corresponding to data that needs to be transmitted via the eNB, thus, the eNB only needs to allocate resources with respect to the data transmitted via the eNB, rather than allocating resources with respect to all data required to be transmitted.

In order to achieve the above purposes, the present disclosure provides a method for reporting a buffer status, which is applied to a wireless communication terminal operable in a dual connection wireless communication network including an MeNB and an SeNB, where the method includes: determining target upload data; determining, in the target upload data, first data which is transmitted only via a target eNB of the MeNB and the SeNB, and second data transmitted via both the MeNB and the SeNB; and sending a sum of a first data buffer size and a second data buffer size to the target eNB, where the first data buffer size is a size of the first data, and the second data buffer size is smaller than or equal to a size of the second data.

Optionally, the second data buffer size is equal to a size of data in the second data separated and transmitted via the target eNB in the second data.

Optionally, the method may further include: determining and sending, to the target eNB, data corresponding to the sum of the first data buffer size and the second data buffer size.

Optionally, a ratio between the second data buffer size and the size of the second data is equal to a predetermined percentage, the predetermined percentage is greater than zero and smaller than 100%, and a sum of the second data buffer size and a data buffer size is equal to the size of the second data, the data buffer size is sent to the other eNB of the MeNB and the SeNB and correspond to data separated and transmitted via the other eNB in the second data.

Optionally, the predetermined percentage is configured via a network side and sent to the wireless communication terminal.

Optionally, the present disclosure further provides a method for processing a buffer status, which is applied to a target eNB of an MeNB and an SeNB in a dual connection wireless communication network, where the method includes: receiving a data buffer size sent by a wireless communication terminal, where the data buffer size is a size of target upload data from the wireless communication terminal; and determining a third data buffer size corresponding to data transmitted via the target eNB, where a sum of the third data buffer size and a data buffer size corresponding to data transmitted via the other eNB is equal to the data buffer size sent to the target eNB from the wireless communication terminal.

Optionally, only the target eNB of the MeNB and the SeNB receives the data buffer size from the wireless communication terminal; and the step of determining the third data buffer size corresponding to data transmitted via the target eNB includes: determining the third data buffer size corresponding to data transmitted via the target eNB and a fourth data buffer size corresponding to data transmitted via the other eNB, obtaining data buffer size allocation information, where a sum of the third data buffer size and the fourth data buffer size is equal to the data buffer size sent to the target eNB from the wireless communication terminal; and sending the data buffer size allocation information to the other eNB, such that the other eNB allocates corresponding resources to the wireless communication terminal based on the data buffer size allocation information.

Optionally, the MeNB and the SeNB are capable of receiving the data buffer size from the wireless communication terminal, a ratio between the third data buffer size and the data buffer size from the wireless communication terminal is equal to a predetermined percentage, the predetermined percentage is greater than zero and smaller than 100%, and a sum of the third data buffer size and a data buffer size determined by the other eNB is equal to a data buffer size sent to any one of the master eNB and the secondary eNB from the wireless communication terminal.

The present disclosure further provides a device for reporting a buffer status, which is applied to a wireless communication terminal operable in a dual connection wireless communication network including an MeNB and an SeNB, where the device includes: a first determining module, configured to determine target upload data; a second determining module, configured to determine in the target upload data, first data which is transmitted only via a target eNB of the MeNB and the SeNB, and second data transmitted via both the MeNB and the SeNB; and a sending module, configured to send a sum of a first data buffer size and a second data buffer size to the target eNB, where the first data buffer size is a size of the first data, and the second data buffer size is smaller than or equal to a size of the second data.

Optionally, the second data buffer size is equal to a size of data separated and transmitted via the target eNB in the second data.

Optionally, the device may further include a third determining module, which is configured to determine and sending, to the target eNB, data corresponding to the sum of the first data buffer size and the second data buffer size.

Optionally, a ratio between the second data buffer size and the size of the second data is equal to a predetermined percentage, the predetermined percentage is greater than zero and smaller than 100%, and a sum of the second data buffer size and a data buffer size is equal to the size of the second data, the data buffer size is sent to the other eNB of the MeNB and the SeNB and correspond to data separated and transmitted via the other eNB in the second data.

Optionally, the predetermined percentage is configured via a network side and sent to the wireless communication terminal.

The present disclosure further provides a terminal, which includes the device for reporting the buffer status described above.

The present disclosure further provides a device for processing a buffer status, which is applied to a target eNB of an MeNB and an SeNB in a dual connection wireless communication network, where the device includes: a receiving module, configured to receive a data buffer size sent by a wireless communication terminal, where the data buffer size is a size of target upload data from the wireless communication terminal; and a fourth determining module, configured to determine a third data buffer size corresponding to data transmitted via the target eNB, where a sum of the third data buffer size and a data buffer size corresponding to data transmitted via the other eNB is equal to the data buffer size sent to the target eNB from the wireless communication terminal.

Optionally, only the target eNB of the MeNB and the SeNB receives the data buffer size from the wireless communication terminal; and the fourth determining module includes:a determining unit, configured to determine the third data buffer size corresponding to data transmitted via the target eNB and a fourth data buffer size corresponding to data transmitted via the other eNB, and obtain obtain data buffer size allocation information, where a sum of the third data buffer size and the fourth data buffer size is equal to the data buffer size sent to the target eNB from the wireless communication terminal; and a sending unit, configured to send the data buffer size allocation information to the other eNB, such that the other eNB allocates corresponding resources to the wireless communication terminal based on the data buffer size allocation information.

Optionally, the MeNB and the SeNB are capable of receiving the data buffer size from the wireless communication terminal, a ratio between the third data buffer size and the data buffer size from the wireless communication terminal is equal to a predetermined percentage, the predetermined percentage is greater than zero and smaller than 100%, and a sum of the third data buffer size and a data buffer size determined via the other eNB is equal to a data buffer size sent to any one of the MeNB and the SeNB from the wireless communication terminal.

The present disclosure further provides an eNB, which includes the device for processing the buffer status described above.

The beneficial effects of the above technical solutions in the present disclosure are as follows.

The present disclosure provides a method, a device and a terminal for reporting a buffer status, and a method, a device and an eNB for processing a buffer status, with which the eNB can determine a data buffer size corresponding to data needs to be transmitted via the eNB, thus, the eNB only needs to allocate resources with respect to the data transmitted via the eNB, rather than allocating resources with respect to all data required to be transmitted.

DETAILED DESCRIPTION OF THE EMBODIMENTS

In order to make the technical problems and the technical solutions and the advantages of the present disclosure more apparent, the present disclosure will be described hereinafter in detail in conjunction with the drawings and specific embodiments.

In view of problems of the conventional technologies, i.e., in a mechanism of data distribution for wireless network, a user equipment (UE) sends to each eNB a BSR corresponding to the total size of data to be transmitted when reporting BSRs, and then the eNB allocates resources according to the received BSR, thereby resulting in a waste of resources, thus, embodiments of the present disclosure provide a method, a device and a terminal for reporting a buffer status, and a method, a device and an eNB for processing a buffer status, with which the eNB can determine a data buffer size corresponding to data needs to be transmitted via the eNB, thus, the eNB only needs to allocate resources with respect to the data transmitted via the eNB, rather than allocating resources with respect to all data required to be transmitted.

Figure 6:
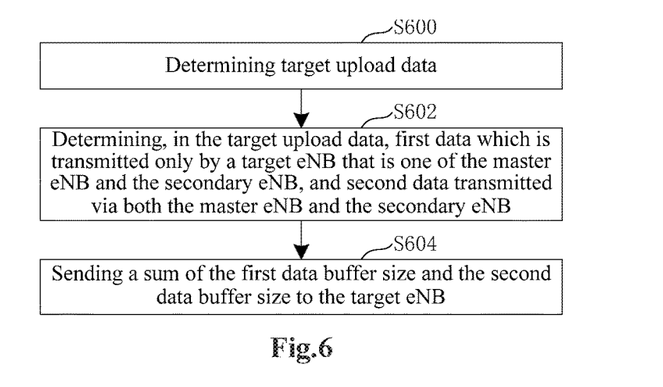
FIG. 6 is a flow chart of a method for reporting a buffer status according to a first embodiment of the present disclosure.

A flow chart of a method for reporting a buffer status according to a first embodiment of the present disclosure is shown in FIG. 6, the method may be applied to a wireless communication terminal, which is operable in a dual connection radio communication network including an MeNB and an SeNB, as shown in FIG. 6, the method includes steps S600 to S604.

In step S600, target upload data is determined.

In step 602, first data in the target upload data, which is transmitted only via one (referring to a target eNB) of the MeNB and the SeNB, and second data transmitted via both the MeNB and the SeNB is determined.

In step S604, a sum of a first data buffer size and a second data buffer size is sent to the target eNB, where the first data buffer size is a size of the first data, and the second data buffer size is smaller than or equal to a size of the second data.

In above technical solution, the method for reporting the buffer status is applied to the wireless communication terminal, the wireless communication terminal uploads data through the MeNB and the SeNB, the uploaded data includes first data uploaded only via one eNB, and second data uploaded via both the MeNB and the SeNB, the wireless communication terminal sends to the eNB a data buffer size corresponding to the first data and a second data buffer size, upon determining the first data and the second data. Specifically, the second data buffer size is smaller or equal to a data size of the second data; the eNB allocates corresponding resources after receiving the first data buffer size and the second data buffer size. Since the buffer size of the first data which need to be transmitted only via a target eNB and the second data buffer size are transmitted to the target eNB, the target eNB allocates to the wireless communication terminal resources which are required in case of transmitting the first data and resources which are required in case of transmitting of data corresponding to the second data buffer size, and the other target eNB allocates to the wireless communication terminal a resource which is required in case of transmitting data only transmitted via the other target eNB, compared with a technical solution in conventional technologies, in which, each eNB needs to allocate to a wireless communication terminal resources corresponding to all transmitted data, i.e., the eNB also allocates resources for data not transmitted via this eNB, a waste of resources is avoided with technical solutions in the present disclosure.

When the wireless communication terminal UE performs distribution transmission on uplink data on a certain logic channel or a bearer, the UE can calculate respective data buffer size for the logic channel or the bearer, on basis of a size of data to be transmitted on the logic channel or the bearer for the MeNB and the SeNB.

That is to say, a data buffer size reported by the UE to the MeNB only includes: a size of data to be transmitted to only the MeNB in bearers corresponding to logic channels, i.e., a size of data only transmitted via the MeNB; and a size of all data to be transmitted in bearers corresponding to a portion of an LCG where the data are to be transmitted via the MeNB and distributed through an SeNB, i.e., a size of data capable of being transmitted via both the MeNB and the SeNB.

The data buffer size reported by the UE to the SeNB only includes: a size of data to be transmitted to only the SeNBin bearers corresponding to logic channels, i.e., a size of data only transmitted via the SeNB; and a size of all data to be transmitted in bearers corresponding to a portion of an LCG where the data are to be transmitted via the MeNB and distributed through an SeNB, i.e., a size of data capable of being transmitted via both the MeNB and the SeNB.

Provided that the eNB allocates enough resource for uplink transmission to the UE, i.e., data to be transmitted and to be distributeed is completely transmitted, the UE then dynamically distribute uplink data based on the uplink resources provided by the eNB.

By way of example, a UE needs to transmit 100 megabyte of data via an eNB 1 and an eNB 2, a corresponding data buffer size is 100 megabyte, in which: 20 megabyte of data is transmitted separately by the eNB 1, 30 megabyte of data is transmitted separately by the eNB 2, 50 megabyte of data is transmitted via the eNB 1 and the eNB 2, therefore, a first data buffer size sent by the UE to the eNB 1 is equal to 20 megabyte, and a second data buffer size sent by the UE to the eNB 1 is smaller than or equal to 50 megabyte, then the eNB 1 allocates at most 70 megabyte of resources to the UE; a first data buffer size sent by the UE to the eNB 2 is equal to 30 megabyte, and a second data buffer size sent by the UE to the eNB 1 is smaller than or equal to 50 megabyte, then the eNB 2 allocates at most 80 megabyte of resources to the UE, however, in the conventional technologies, the UE transmits 100 megabyte of a data buffer size to both the eNB 1 and the eNB 2, such that both the eNB 1 and the eNB 2 allocates 100 megabyte of resources for the UE.

Optionally, the second data buffer size is equal to a size of data separated and transmitted via the target eNB in the second data.

In above technical solutions, the second data buffer size is a size of data needs to be separated and transmitted via the target eNB.

That is to say, the data buffer size reported by the UE to the MeNB only includes: a size of data to be transmitted to only the MeNB in bearers corresponding to logic channels, i.e., a size of data only transmitted via the MeNB; and a size of data to be transmitted via MeNB in bearers corresponding to a portion of an LCG where the data are to be transmitted via the MeNB and distributed through an SeNB, i.e., a size of data to be transmitted via MeNB among the data capable of being transmitted via both the MeNB and the SeNB.

A data buffer size reported by the UE to the SeNB only includes: a size of data to be transmitted to only the SeNB in bearers corresponding to logic channels, i.e., a size of data only transmitted via the SeNB; and a size of data to be transmitted via SeNB in bearers corresponding to a portion of an LCG where the data are to be transmitted via the MeNB and distributed through an SeNB, i.e., a size of data to be transmitted via SeNB among the data capable of being transmitted via both the MeNB and the SeNB.

Based on the above example, for 50 megabyte of data transmitted via the eNB 1 and eNB 2, 20 megabyte of which is separated and transmitted via the eNB 1, and 30 megabyte of data is separated and transmitted via the eNB 2, therefore, a first data buffer size sent by the UE to the eNB 2 is 30 megabyte, and a second data buffer size sent by the UE to the eNB 2 is 30 megabyte, thus, the eNB 2 allocates 60 megabyte of resources; a first data buffer size sent by the UE to the eNB 1 is 20 megabyte, and a second data buffer size sent by the UE to the eNB 1 is 20 megabyte, thus, the eNB 1 allocates 40 megabyte of resources, a sum of each resources which is allocated to the UE by the eNB 1 and the eNB 2 is 100 megabyte, which just meets the requirement of the UE, thereby avoiding a waste of resources.

Optionally, the method further includes: determining and sending, to the target eNB, data corresponding to the sum of the first data buffer size and the second data buffer size.

In the above technical solution, upon determining and sending the first data buffer size and the second data buffer size, the wireless communication terminal sends to the target eNB data corresponding to a sum of the first data buffer size and the second data buffer size, such that the target eNB transmits corresponding data through resources allocated to the target eNB.

Optionally, a ratio between the second data buffer size and the size of the second data is equal to a predetermined percentage, the predetermined percentage is greater than zero and smaller than 100%, and a sum of the second data buffer size and a data buffer size is equal to the size of the second data, the data buffer size corresponds to data which are sent to the other eNB, and separated and transmitted via the other eNB among the second data.

In the above technical solution, the second data buffer size is determined according to a predetermined percentage and the size of the second data, the predetermined percentage ranges from 0 to 100%, and a sum of the determined second data buffer size and a data buffer size corresponding to data among the second data which are sent to other nNB and streamed and transmitted via the other eNB is equal to the data size of the second data.

That is to say, a data buffer size reported by the UE to the MeNB only includes: a size of data to be transmitted to only the MeNB in bearers corresponding to logic channels, i.e., a size of data only transmitted via the MeNB; and a size of data corresponding to a first predetermined percentage among a size of all data to be transmitted in bearers corresponding to a portion of an LCG where the data are to be transmitted via the MeNB and distributed through an SeNB, for example, 50% of the total size of data to be transmitted, i.e., a ratio between a data suffer size reported to the MeNB and a size of data transmitted via both the MeNB and the SeNB is equal to the first predetermined percentage, where the first percentage may be a fixed value, which may be configured via a network, and may also be a value configured automatically.

A data buffer size reported by the UE to the SeNB only includes: a size of data to be transmitted to only the SeNB in bearers corresponding to logic channels, i.e., a size of data only transmitted via the SeNB; and a size of data corresponding to a second predetermined percentage among a size of all data to be transmitted in bearers corresponding to a portion of an LCG where the data are to be transmitted via the MeNB and distributed through an SeNB.

Specifically, each of the first percentage and the second percentage ranges from 0 to 100%, and a sum of the first percentage and the second percentage is 1.

Based on the above example, predetermined percentages for the eNB 1 and eNB 2 are 40% and 60% respectively, for 50 megabyte of data transmitted via both the eNB 1 and eNB 2, 20 megabyte of which is separated and transmitted via the eNB 1, and 30 megabyte of data is separated and transmitted via the eNB 2, therefore, a first data buffer size sent by the UE to the eNB 2 is 30 megabyte, and a second data buffer size sent by the UE to the eNB 2 is 30 megabyte, thus, the eNB 2 allocates 60 megabyte of resources; a first data buffer size sent by the UE to the eNB 1 is 20 megabyte, and a second data buffer size sent by the UE to the eNB 1 is 20 megabyte, thus, the eNB 1 allocates 40 megabyte of resources, a sum of each resources which is allocated to the UE by the eNB 1 and the eNB 2 is 100 megabyte, which just meets the requirement of the UE, thereby avoiding a waste of resources.

Optionally, the predetermined percentage is configured and sent by a network side to the wireless communication terminal.

Figure 7:
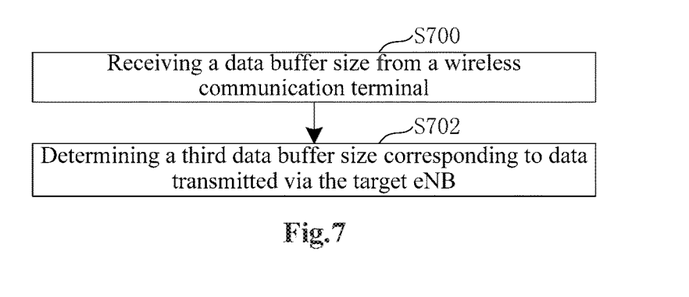
FIG. 7 is a flow chart of a method for processing a buffer status according to a second embodiment of the present disclosure.

A flow chart of a method for processing a buffer status in a second embodiment of the present disclosure is shown in FIG. 7, and the method for processing the buffer status is applied to a target eNB of an MeNB and an SeNB in a dual connection wireless communication network, as shown in FIG. 7, the method for processing the buffer status includes the following steps S700 and S702.

In step S700, a data buffer size is received from a wireless communication terminal, where the data buffer size is a size of target upload data from the wireless communication terminal.

In step S702, a third data buffer size corresponding to data transmitted via the target eNB is determined, where a sum of the third data buffer size and a data buffer size corresponding to data transmitted via the other eNB is equal to the data buffer size sent to the target eNB from the wireless communication terminal.

In the above technical solution, the method for processing the suffer status is applied to a target eNB of an MeNB and an SeNB in a dual connection wireless communication network. A data suffer size corresponding to data transmitted via the target eNB is determined according to a data buffer size received from a wireless communication terminal, that is to say, the target eNB determines or allocates a value of the data suffer size for the wireless communication terminal, and the target eNB allocates resources according to the value of the data suffer size, thereby avoiding resource allocation for all data to be transmitted.

Optionally, only the target eNB of the master eNB and the secondary eNB receives the data buffer size from the wireless communication terminal; and the step of determining the third data buffer size corresponding to data transmitted via the target eNB includes: determining the third data buffer size corresponding to data transmitted via the target eNB and a fourth data buffer size corresponding to data transmitted via the other eNB, obtaining allocation information about data buffer size, where a sum of the third data buffer size and the fourth data buffer size is equal to the data buffer size sent to the target eNB from the wireless communication terminal; and sending the allocation information of a data buffer size to the other eNB, such that, the other eNB allocates corresponding resources to the wireless communication terminal based on the data buffer size allocation information.

In the above technical solution, since only the target base station of the MeNB and the SeNB can receive the data buffer size from the wireless communication terminal, thus, the target base station should determine or allocate values of data buffer size for itself and the other base station, and a sum of a data buffer size of the target base station and a data buffer size of the other base station is equal to the data buffer size sent by the wireless communication terminal, and the data buffer size allocated to the other base station is informed to the other base station, such that the other base station can allocate corresponding resources for the wireless communication terminal according to this data buffer size.

The UE reports to an eNB a total size of data BSR0 to be transmitted on bearers corresponding to an LCG, the eNB may be an MeNB or an SeNB, the eNB determines or allocates a data buffer size, indicated as BSR1, and a data buffer size, indicated as BSR 2, is allocated to the other eNB and informed to the other eNB, a sum of the BSR 1 and the BSR 2 is BSR 0, the both eNBs allocate resources for the UE according to values of allocated data buffer sizes respectively.

By way of example, a UE needs to transmit 100 megabyte of data via an eNB 1 and an eNB 2, a corresponding data buffer size is 100 megabyte, 100 megabyte of a data buffer size is reported to the eNB 1 by the UE, the eNB 1 allocates 60 megabyte of a data buffer size for itself, then 40 megabyte of a data buffer size is allocated to the eNB 2, therefore, the eNB 1 allocates 60 megabyte of resources for the UE, and the eNB 2 allocates 40 megabyte of resources for the UE.

Optionally, the MeNB and the SeNB are capable of receiving the data buffer size from the wireless communication terminal, a ratio between the third data buffer size and the data buffer size from the wireless communication terminal is equal to a predetermined percentage, the predetermined percentage is greater than zero and smaller than 100%, and a sum of the third data buffer size and a data buffer size determined by the other eNB is equal to a data buffer size sent to any one of the MeNB and the SeNB from the wireless communication terminal.

The UE reports to the both eNBs a value BSR0 of total size of data to be transmitted on bearers corresponding to an LCG, and both of the eNBs allocate data buffer sizes according to predetermined percentages, where a sum of predetermined percentages corresponding to the two eNBs is 1, i.e., a sum of respective data buffer sizes determined according to respective predetermined percentages is equal to a data buffer size reported by the wireless communication terminal, the predetermined percentages may be fixed values, which may be configured via network, or may be values configured automatically, or may be values interacted dynamically, such as percentages determined by the both eNBs, and the both eNBs allocate resources for the UE according to respective allocated data buffer size.

By way of example, a UE needs to transmit 100 megabyte of data via an eNB 1 and an eNB 2, a corresponding data buffer size is 100 megabyte, 100 megabyte of a data buffer size is reported to the eNB 1 by the UE, and 100 megabyte of a data buffer size is reported to the eNB 2 by the UE, the eNB 1 and the eNB 2 allocate values of data buffer size based on predetermined percentages, in a case that the predetermined percentages are 60% and 40% respectively, then 60 megabyte of a data buffer size is allocated to the eNB 1 and 40 megabyte of a data buffer size is allocated to the eNB 2, therefore, the eNB 1 allocates 60 megabyte of resources for the UE and the eNB 2 allocates 40 megabyte of resources for the UE.

Figure 8:
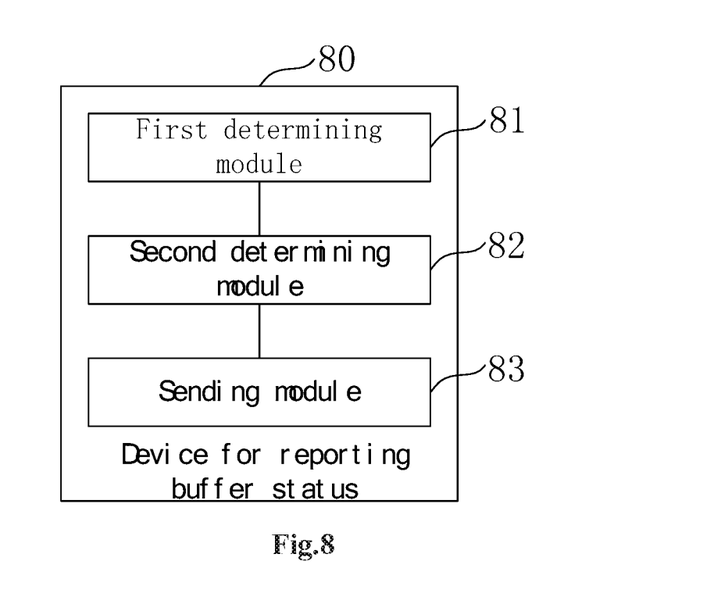
FIG. 8 is a schematic structural diagram of a device for reporting a buffer status according to a first embodiment of the present disclosure.

A schematic structural diagram of a device for reporting a buffer status in a first embodiment of the present disclosure is shown in FIG. 8. The device for reporting a buffer status is applied to a wireless communication terminal, operable in a dual connection wireless communication network including an MeNB and an SeNB, as shown in FIG. 8, the device 80 includes:

a first determining module 81, configured to determine target upload data;

a second determining module 82, configured to determine first data which is transmitted only by a target eNB of the MeNB and the SeNB, and second data transmitted via both the MeNB and the SeNB; and a sending module 83, configured to send a sum of a first data buffer size and a second data buffer size to the target eNB, where the first data buffer size is a size of the first data, and the second data buffer size is smaller than or equal to a size of the second data.

In the above technical solution, the device for reporting the buffer status is applied to a wireless communication terminal, the wireless communication terminal uploads data through an MeNB and an SeNB, the first determining module 81 determines target upload data, which includes a first data merely uploaded via an eNB and second data uploaded via both the MeNB and the SeNB; upon determining the first data and the second data by the second determining module 82, the sending module 83 sends to the eNB a data buffer size corresponding to the first data and a second data buffer size. Specifically, the second data buffer size is smaller or equal to a data size of the second data. After receiving the first data buffer size and the second data buffer size, the eNB allocates corresponding resources. Since the first data buffer size and the second data buffer size are sent to the target eNB, the first data is only transmitted via the target eNB, the target eNB allocates to the wireless communication terminal resources which are required for transmitting the first data and resources which are required for transmitting of data corresponding to the second data buffer size, and the other target eNB allocates to the wireless communication terminal a resource which is required for transmitting data only transmitted via the other target eNB, compared with a technical solution in conventional technologies where each eNB needs to allocate to a wireless communication terminal resources corresponding to all transmitted data, i.e., the eNB also allocates resources for data not transmitted via this eNB, a waste of resources is avoided with technical solutions in the present disclosure.

Optionally, the second data buffer size is equal to a data size of data separated and transmitted via the target eNB in the second data.

Optionally, the device for reporting a buffer status further includes a third determining module, which configured to determine and send, to the target eNB, data corresponding to the sum of the first data buffer size and the second data buffer size.

Optionally, a ratio between the second data buffer size and the size of the second data is equal to a predetermined percentage, the predetermined percentage is greater than zero and smaller than 100%, and a sum of the second data buffer size and a data buffer size corresponding to data separated and transmitted via the other eNB among the second data, and sent to the other eNB, is equal to the size of the second data.

Optionally, the predetermined percentage is configured by a network side and sent to the wireless communication terminal.

The present disclosure further provides a terminal, which including the device for reporting the buffer status described above.

Figure 9:
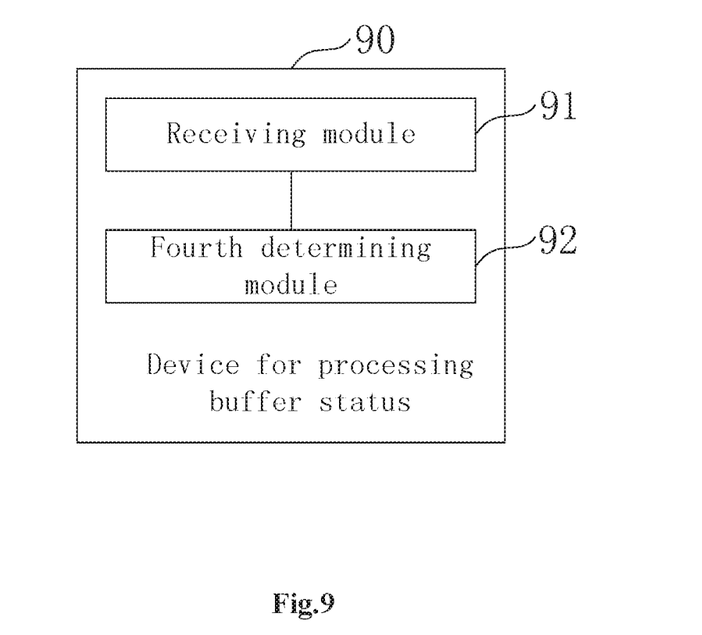
FIG. 9 is a schematic structural diagram of a device for processing a buffer status according to a second embodiment of the present disclosure.

A schematic structural diagram of a device for processing a buffer status in a second embodiment of the present disclosure is shown in FIG. 9. The device for processing a buffer status is applied to a target eNB of an MeNB and an SeNB in a dual connection wireless communication network, as shown in FIG. 9, the device 90 includes: a receiving module 91, configured to receive a data buffer size sent by a wireless communication terminal, where the data buffer size is a size of a target upload data from the wireless communication terminal; and a fourth determining module 92, configured to determine a third data buffer size corresponding to data transmitted via the target eNB, where a sum of the third data buffer size and a data buffer size corresponding to data transmitted via the other eNB is equal to the data buffer size sent to the target eNB from the wireless communication terminal.

In above technical solutions, the device for processing a buffer status is applied to a target eNB of an MeNB and an SeNB in a dual connection wireless communication network, the fourth determining module 92determines a data buffer size corresponding to data transmitted via the wireless communication network according to a data buffer size received by the receiving module 91 from the wireless communication network, i.e., a data buffer size value determined by the target eNB for the wireless communication network, the target eNB allocates resources based on the data buffer size value, thereby avoiding resource allocation by the target eNB for all data needs to be transmitted.

Optionally, only the target eNB of the master eNB and the secondary eNB receives the data buffer size from the wireless communication terminal; and the fourth determining module includes a determining unit and a sending unit. The determining unit is configured to determine the third data buffer size corresponding to data transmitted via the target eNB and a fourth data buffer size corresponding to data transmitted via the other eNB, and obtain allocation information about data buffer size. A sum of the third data buffer size and the fourth data buffer size is equal to the data buffer size sent to the target eNB from the wireless communication terminal. The sending unit is configured to send the allocation information of a data buffer size to the other eNB, such that the other eNB allocates corresponding resources to the wireless communication terminal based on the data buffer size allocation information.

Optionally, the MeNB and the SeNB both are capable of receiving the data buffer size from the wireless communication terminal, a ratio between the third data buffer size and the data buffer size from the wireless communication terminal is equal to a predetermined percentage, the predetermined percentage is greater than zero and smaller than 100%, and a sum of the third data buffer size and a data buffer size determined by the other eNB is equal to a data buffer size sent to any one of the MeNB and the SeNB from the wireless communication terminal.

The present disclosure further provides an eNB, which includes the device for processing the buffer status described above.

Those described above are preferred embodiments of the present disclosure. It should be noted that, the skilled in the art can make improvements and modifications without departing from the principle of the disclosure, and those improvements and modifications all fall in the scope of protection of the present disclosure.

What is claimed is:

1. A method for reporting a buffer status, used for a wireless communication terminal operable in a dual connection wireless communication network comprising a master evolved Node B (MeNB) and a secondary evolved Node B (SeNB), the method comprising:
   determining target upload data;
   determining, in the target upload data, first data transmitted only by a target eNB that is one eNB of the MeNB and the SeNB, and second data transmitted via both the MeNB and the SeNB; and
   sending a sum of a first data buffer size and a second data buffer size to the target eNB, wherein the first data buffer size is a size of the first data, and the second data buffer size is equal to a size of the second data and is calculated by a user equipment (UE) and is sent to the MeNB and SeNB By the UE.

2. The method according to claim 1, wherein the second data buffer size is equal to a size of data separated and transmitted via the target eNB in the second data.

3. The method according to claim 2, further comprising:
   determining and sending, to the target eNB, data corresponding to the sum of the first data buffer size and the second data buffer size.

4. A device for reporting a buffer status, used for a wireless communication terminal operable in a dual connection wireless communication network comprising a master evolved Node B (MeNB) and a secondary evolved Node B (seNB), wherein the device comprises a non-transitory storage medium and at least one processor, the non-transitory storage medium stores instructions, which when executed by the at least one processor, cause the at least one processor to:
   determine target upload data;
   determine in the target upload data, first data transmitted only by a target eNB that is one eNB of the MeNB and the SeNB, and second data transmitted via both the MeNB and the SeNB; and
   send a sum of a first data buffer size and a second data buffer size to the target eNB, wherein the first data buffer size is a size of the first data, buffer size is equal to a size of the second data and is calculated by a user equipment(UE) and is sent to the MeNB and the SeNB by the UE.

5. The device according to claim 4, wherein the second data buffer size is equal to a size of data separated and transmitted via the target eNB in the second data.

6. The device according to claim 5, further comprising instruction that cause the at least one processor to:
   determine and sending, to the target eNB, data corresponding to the sum of the first data buffer size and the second data buffer size.

* * * * *